United States Patent
Tasaki et al.

(10) Patent No.: US 7,369,553 B2
(45) Date of Patent: May 6, 2008

(54) UNICAST/MULTICAST SYSTEM

(75) Inventors: Yuuichi Tasaki, Tokyo (JP); Kazuhiko Isoyama, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 564 days.

(21) Appl. No.: 11/009,003

(22) Filed: Dec. 13, 2004

(65) Prior Publication Data

US 2005/0117579 A1    Jun. 2, 2005

Related U.S. Application Data

(62) Division of application No. 09/676,559, filed on Oct. 2, 2000, now Pat. No. 6,895,006.

(30) Foreign Application Priority Data

Oct. 1, 1999   (JP)   ................................. 11-281549

(51) Int. Cl.
*H04L 12/28*   (2006.01)
(52) U.S. Cl. .................................................... 370/390
(58) Field of Classification Search ........ 370/351–357, 370/386, 389, 390, 395.1, 399, 395.52, 419
See application file for complete search history.

(56) References Cited

U.S. PATENT DOCUMENTS

| | | | |
|---|---|---|---|
| 5,267,235 A | 11/1993 | Thacker | |
| 5,689,505 A * | 11/1997 | Chiussi et al. | 370/388 |
| 5,903,564 A * | 5/1999 | Ganmukhi et al. | 370/399 |
| 5,999,531 A * | 12/1999 | Ferolito et al. | 370/390 |
| 6,115,379 A | 9/2000 | Flanders et al. | |
| 6,188,686 B1 * | 2/2001 | Smith | 370/388 |
| 6,188,690 B1 * | 2/2001 | Holden et al. | 370/390 |
| 6,212,182 B1 | 4/2001 | McKeown | |
| 6,349,097 B1 | 2/2002 | Smith | |
| 6,826,195 B1 * | 11/2004 | Nikolich et al. | 370/465 |

FOREIGN PATENT DOCUMENTS

| | | |
|---|---|---|
| JP | 5-136814 | 6/1993 |
| JP | 5-236011 | 9/1993 |
| JP | 8-251173 | 9/1996 |
| JP | 9-93257 | 4/1997 |
| JP | 10-190663 | 7/1998 |

* cited by examiner

*Primary Examiner*—Dmitry Levitan
(74) *Attorney, Agent, or Firm*—Harrity Snyder, LLP

(57) ABSTRACT

A unicast/multicast system has an internal cell generating section that generates an internal cell to include its output index information based on user data, and an output port conversion table that stores the relation of output index information and output port number for the internal cell in the form of one-to-one for the unicast and one-to-multiple for the multicast.

12 Claims, 6 Drawing Sheets

FIG. 5

OUTPUT PORT NUMBER

|  | 15 | 14 | 13 | 12 | 11 | 10 | 0 | 9 | 7 | 6 | 5 | 4 | 3 | 2 | 1 | 0 |  |
|---|---|---|---|---|---|---|---|---|---|---|---|---|---|---|---|---|---|
| $001_H$ | 0 | 0 | 0 | 0 | 0 | 0 | 0 | 0 | 0 | 0 | 0 | 0 | 0 | 0 | 0 | 1 | ⎫ |
| $002_H$ | 0 | 0 | 0 | 0 | 0 | 0 | 0 | 0 | 0 | 0 | 0 | 0 | 0 | 0 | 1 | 0 | |
| $003_H$ | 0 | 0 | 0 | 0 | 0 | 0 | 0 | 0 | 0 | 0 | 0 | 0 | 0 | 1 | 0 | 0 | FOR UNICAST |
| $004_H$ | 0 | 0 | 0 | 0 | 0 | 0 | 0 | 0 | 0 | 0 | 0 | 0 | 1 | 0 | 0 | 0 | |
| $005_H$ | 0 | 0 | 0 | 0 | 0 | 0 | 0 | 0 | 0 | 0 | 0 | 1 | 0 | 0 | 0 | 0 | |
| $006_H$ |  |  |  |  |  |  |  |  |  |  |  |  |  |  |  |  | |
| $00F_H$ | 1 | 0 | 0 | 0 | 0 | 0 | 0 | 0 | 0 | 0 | 0 | 0 | 0 | 0 | 0 | 0 | ⎭ |
| $010_H$ | 0 | 0 | 0 | 0 | 0 | 0 | 0 | 0 | 0 | 0 | 0 | 0 | 0 | 0 | 1 | 1 | ⎫ |
| $011_H$ | 0 | 0 | 0 | 0 | 0 | 0 | 0 | 0 | 0 | 0 | 0 | 0 | 0 | 1 | 0 | 1 | |
| $012_H$ | 0 | 0 | 0 | 0 | 0 | 0 | 0 | 0 | 0 | 0 | 0 | 0 | 1 | 0 | 0 | 1 | FOR MULTICAST |
| ⋮ |  |  |  |  |  |  |  |  |  |  |  |  |  |  |  |  | |
| $FFF_H$ |  |  |  |  |  |  |  |  |  |  |  |  |  |  |  |  | ⎭ |

KIND OF INDEX INFORMATION

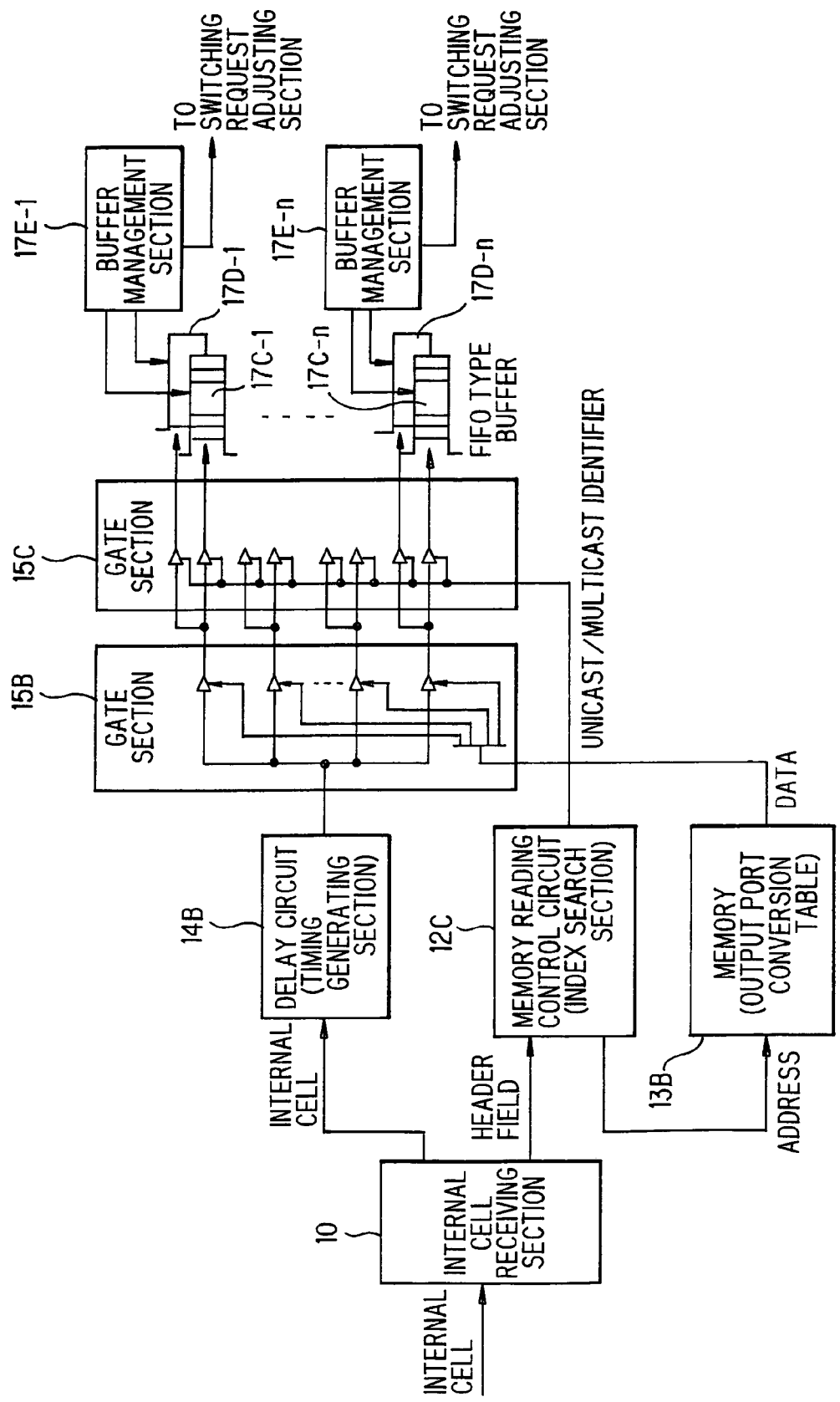

UNICAST/MULTICAST SYSTEM

This application is a division of application Ser. No. 09/676,559, filed on Oct. 2, 2000, the entire contents of which are hereby incorporated by reference.

FIELD OF THE INVENTION

This invention relates to a system for unicasting or multicasting IP packets, ATM cells etc.

BACKGROUND OF THE INVENTION

As a switch for processing a multicast cell, for example, Japanese patent application laid-open No. 9-162879 (1997) discloses a shared buffer type ATM. This ATM switch has address buffers provided for its output ports, respectively. The multicast is conducted by sequentially transferring the address pointer of a shared buffer where a multicast cell is stored. Also, the ATM switch needs to be provided with a counter for confirmation of the number of broadcast to be decremented every time a multicast cell is output.

However, the ATM switch has problems below.

The first problem is that it is necessary to provide a large amount of the buffer for multicast so as to cope with a case that the ratio of multicast cells in traffic increases.

The second problem is that it may cause the lowering of throughput since the subsequent multicast processing cannot be run before the counter for confirmation of the number of broadcast becomes zero.

SUMMARY OF THE INVENTION

Accordingly, it is an object of the invention to provide a unicast/multicast system that allows a unicast cell and a multicast cell to be processed in the same circuit.

According to the invention, a unicast/multicast system, comprises:

an internal cell generating section that generates an internal cell based on user data;

an internal cell receiving section that outputs the internal cell to a timing generating section and outputs a header field of the internal cell to an index search section;

an output port conversion table that stores the relation of output index information and output port number in the form of one-to-one for the unicast and one-to-multiple for the multicast;

the index search section that extracts output index information from the header field to be sent from the internal cell receiving section, refers to the output port conversion table for an output port number corresponding to the output index information extracted, and outputs the output port number obtained from the output port conversion table to a destination-based distribution section;

the destination-based distribution sections that controls a gate section based on the output port number input from the index search section;

a timing generating section that delays the internal cell input from the internal cell receiving section and then outputs it the gate section;

the gate section that distributes the internal cell input from the timing generating section to the gate section according to the control of the destination-based distribution section;

a plurality of buffers that each store the internal cell distributed from the gate section and, when receiving the internal cell distributed from the gate section, sends switching request signal to a switching request adjusting section;

the switching request adjusting section that adjusts the switching request signal input from the buffers between the buffers and determines a route in a crosspoint switch; and the crosspoint switch that outputs the internal cell stored in the buffers through the route determined by the switching request adjusting section.

BRIEF DESCRIPTION OF THE DRAWINGS

The invention will be explained in more detail in conjunction with the appended drawings, wherein:

FIG. 5 is a table showing the content of a memory 13B in FIG. 4;

FIG. 6 is a block diagram showing the composition of a unicast/multicast system in a second preferred embodiment according to the invention.

DESCRIPTION OF THE PREFERRED EMBODIMENTS

Figure 1:
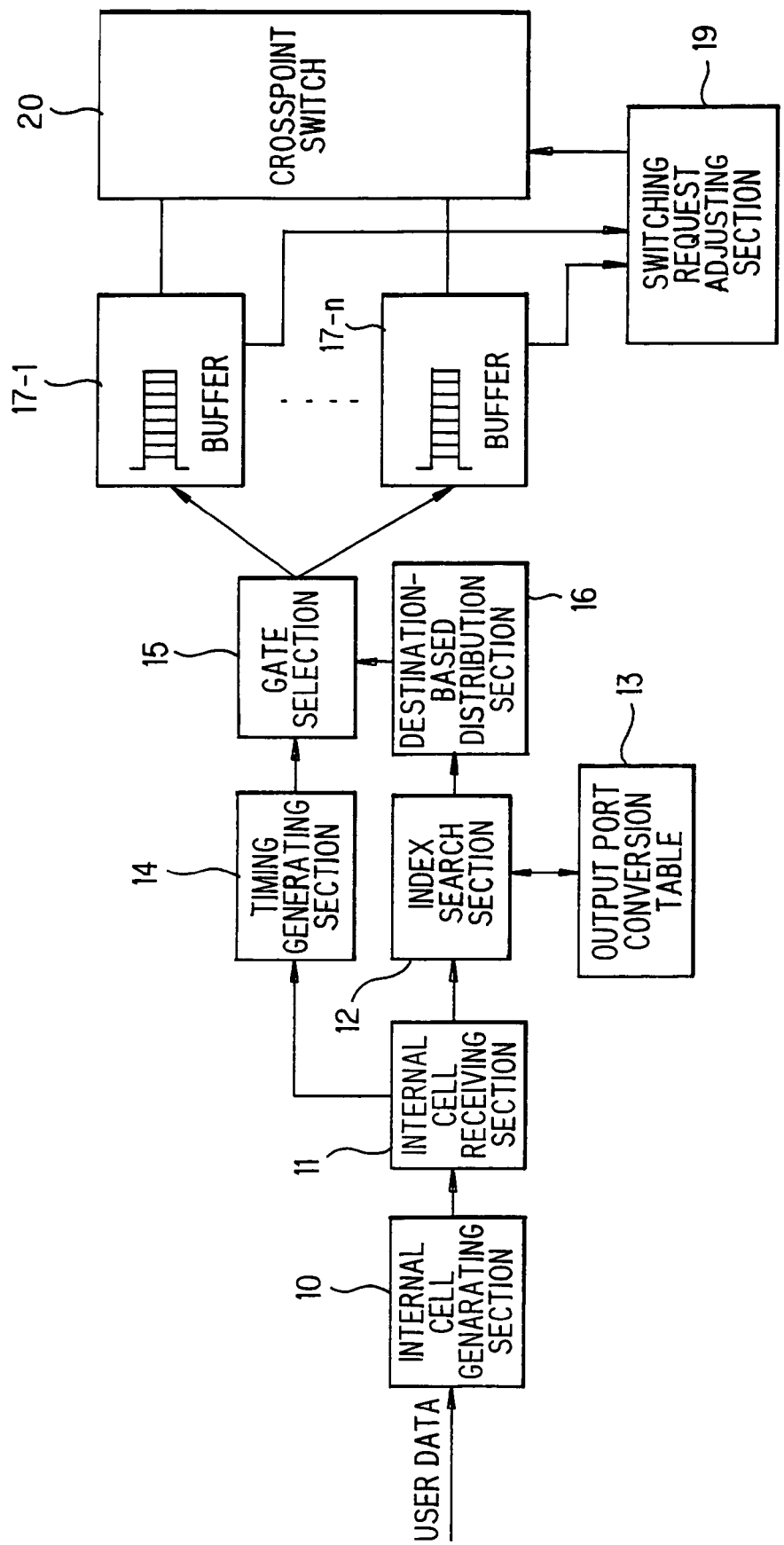
FIG. 1 is a block diagram showing the schematic composition of a unicast/multicast system in a preferred embodiment according to the invention.

The preferred embodiments of the invention will be explained below, referring to the drawings.

FIG. 1 is a block diagram showing the schematic composition of a unicast/multicast system according to the invention. In FIG. 1, 10 is an internal cell generating section to generate a cell (hereinafter referred to internal cell) with a fixed length and a specific format dedicated to switching, based on user data such as IP packet (Internet protocol), ATM (asynchronous transfer mode) cell etc. 11 is an internal cell receiving section that has a function to extract a header field from the internal cell. 12 is an index search section to get output port information corresponding to output index information included in the header field by referring to an output port conversion table 13. 13 is the table to store multiple index information and multiple output port number information in the form of one-to-one for the unicast and one-to-multiple for the multicast. 14 is a timing generating section to make the output of internal cell delay a predetermined time. 15 is a gate section that functions as a route to buffers 17-1 to 17-n to store the internal cell. 16 is a destination-based distribution section that controls the gate section 15 according to the output port information. 17-1 to 17-n are the FIFO (first-in first-out) type buffers that are provided for output ports, respectively, and store the internal cell for corresponding one of the output ports. Optionally, the buffers 17-1 to 17-n may be divided into buffers for the unicast and buffers for the multicast. 19 is a switching request adjusting section that controls a crosspoint switch 20 according to a switching request from the buffers 17-1 to 17-n.

Figure 2:
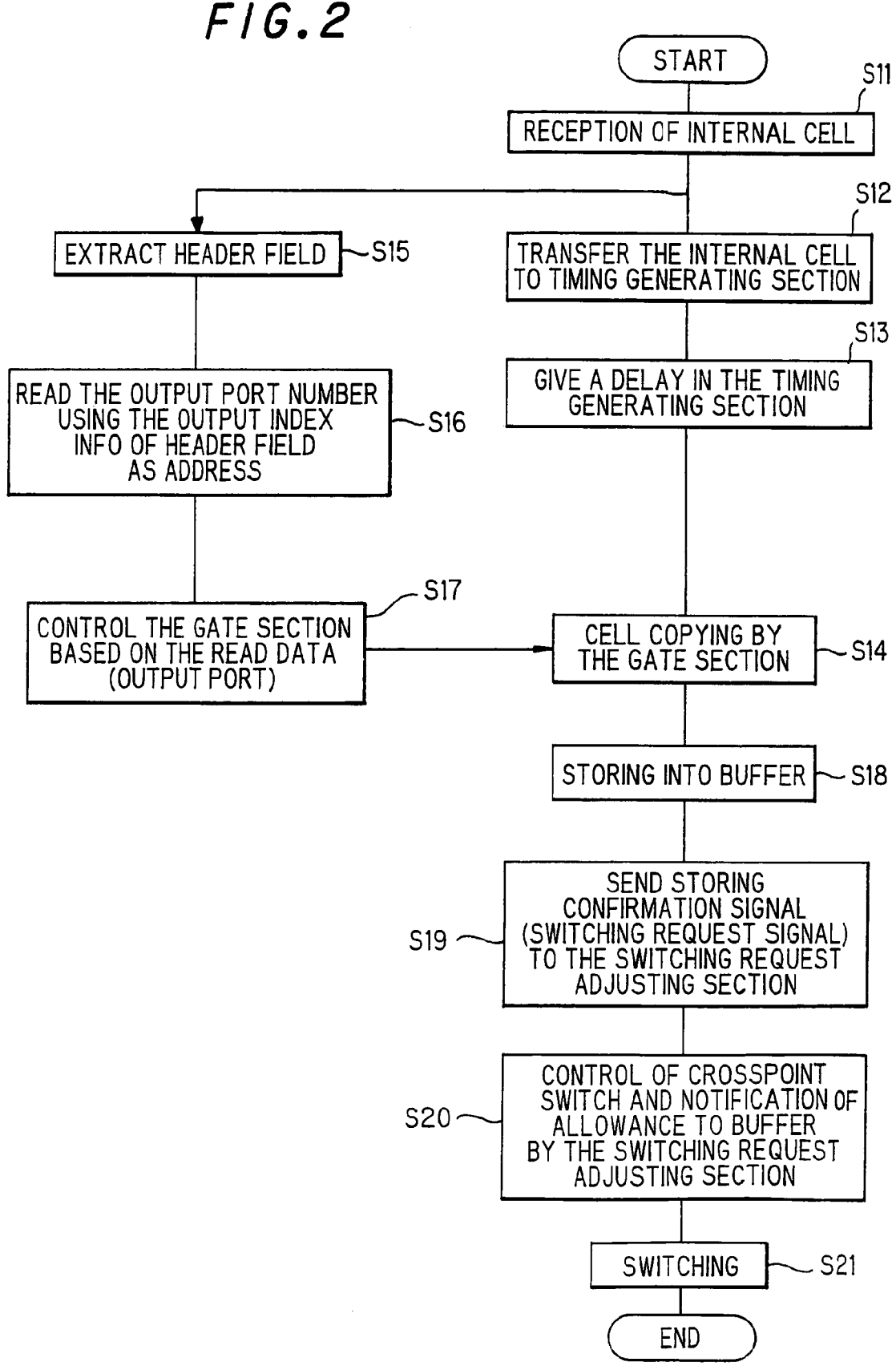
FIG. 2 is a flow chart showing the operation of the unicast/multicast system in FIG. 1.
Figure 3:
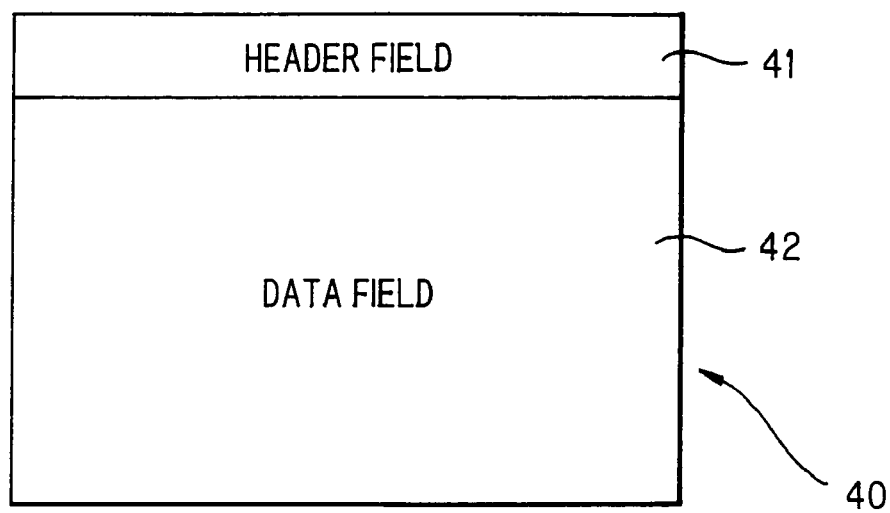
FIG. 3 is a format diagram showing an internal cell used in the unicast/multicast system in the embodiment of the invention.

Referring to FIGS. 1, 2 and 3, the operation of the unicast/multicast system explained above will be explained below.

The internal cell generating section 10 converts global user data such as IP packet and ATM cell into internal cell. As shown by a format diagram in FIG. 3, an internal cell 40 is composed of a header field 41 and a data field 42. The header field 41 stores destination information such as VPI/ VCI (virtual path identifier/virtual channel identifier) etc. that is converted into particular and simple form so that the internal cell is correctly subject to the switching inside the unit. The data field 42 stores the original user data. The internal cell receiving section 11 receives the internal cell 40 (step S11). Then, the internal cell receiving section 11 sends the header field 41 of the received internal cell 40 to the index search section 12, and sends the entire internal cell 40 to the timing generating section 14 (step S12). The index search section 12 extracts output index information from the header information of the header field 41 (step S15). After extracting the output index information of the header field 41, the index search section 12 gets output port number by referring to the output port conversion table 13 (step S16). The index search section 12 sends the obtained output port number to the destination-based distribution section 16. The destination-based distribution section 16 controls the gate section 15 according to the output port number received from the index search section 12 (step S17). In this case, when only one output port number is obtained, the gate to one output port opens, and when multiple output port numbers are obtained, the gates to multiple output ports open. On the other hand, the timing generating section 14 makes the internal cell sent to the timing generating section 14 delay the predetermined time that is necessary for the index search section 12 to search the output port number and for the destination-based distribution section 16 to control the gate section 15 (step S13). After the route of gate section 15 is determined, the internal cell is stored, through the gate section 15, into a specific buffer 17-i ($1 \leq i \leq n$) corresponding to the output port in case of the unicast, and into multiple buffers 17-$i_1$, . . . , 17-$i_m$ ($i_1 \geq 1$ and $i_m \leq n$) in case of the multicast (step S14, S18). After the internal cell is stored in the buffer 17-i or buffers 17-$i_1$, . . . , 17-$i_m$, the buffer 17-i or buffers 17-$i_1$, . . . , 17-$i_m$ sends the switching request to the switching request adjusting section 19 (step S19). The switching request adjusting section 19 conducts fairly the adjustment to the switching request received from the multiple buffers 17-1 to 17-n in a unit time, and determines the route of the crosspoint switch 20 (step S20). The crosspoint switch 20 establishes the route to pass the internal cell based on the route information from the switching request adjusting section 19, and conducts the switching of the internal cell (step S21).

First Embodiment

Figure 4:
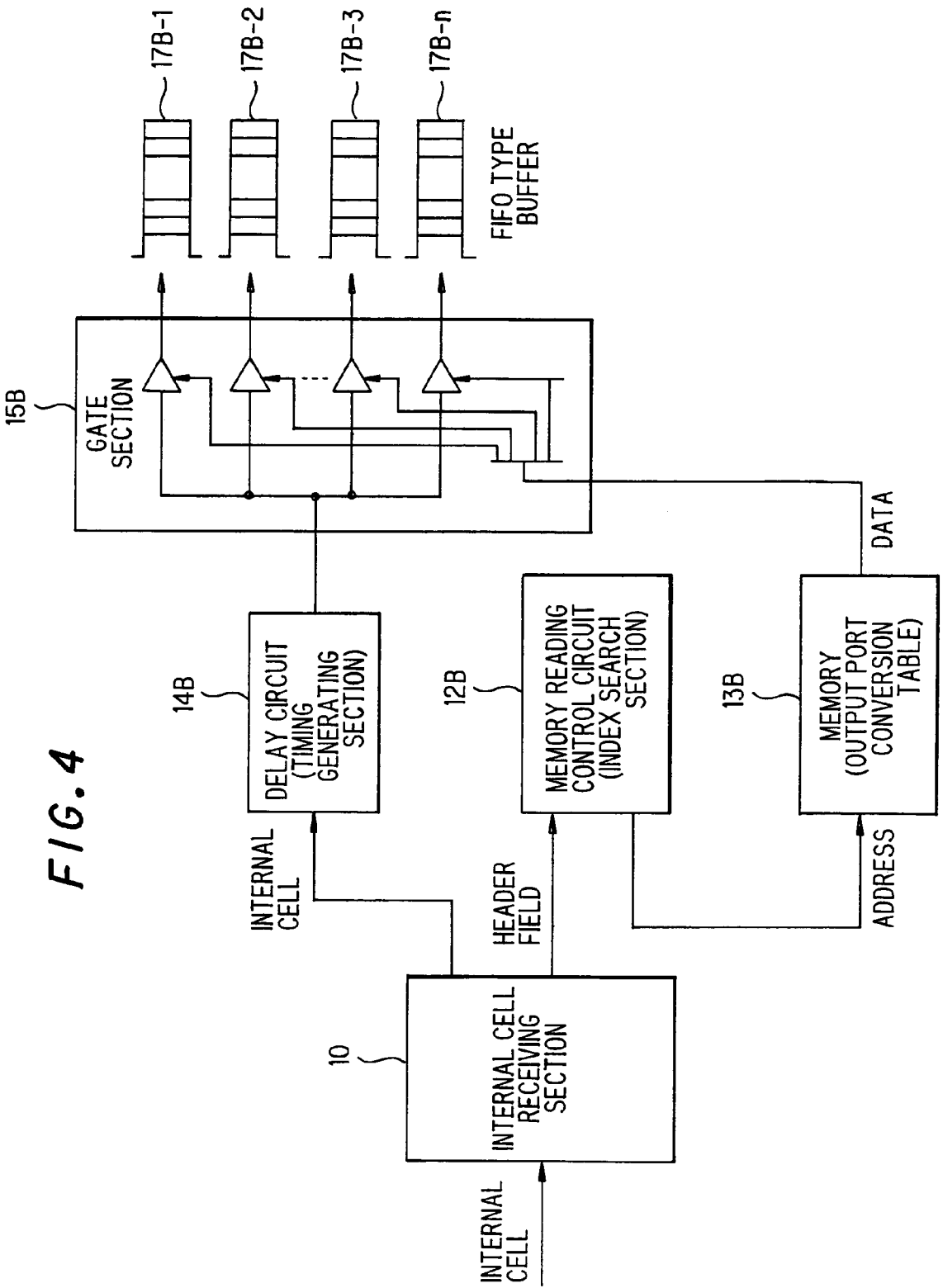
FIG. 4 is a block diagram showing the composition of a unicast/multicast system in a first preferred embodiment according to the invention.

A unicast/multicast system in the first preferred embodiment according to the invention will be explained below, referring to FIGS. 4 and 5.

In this embodiment, as the output port conversion table 13, a memory 13B such as RAM (random access memory) or ROM (read-only memory) is used. In this case, the output index information to be extracted by a memory reading control circuit 12B to function as the index search section 12 corresponds to an address of the memory 13B, and the output port number corresponds to data to be written in each address of the memory 13B. Also, the memory 13B also functions as the destination-based distribution section 16. The output port number is stored in the form of bit pattern so as to facilitate the control of the gate section 15B. In case of the bit pattern form, the number n of ports corresponds to the data width of the memory 13B. Therefore, when a complete unicast region is, in advance, made using a memory of wide data width, it can cope with even such a case that the number n of ports increases, by adding bit pattern information for the multicast to the memory 13B.

FIG. 5 shows an example of the content of the memory 13B in a case that there are 4095 ($=2^{16}-1$) types of output index information and there are 16 output ports. According to need, the output index information can be expanded to 65535 ($=2^{16}-1$) types. The address range of 000H to 00FH is used for the unicast, and the address range of 010H to FFFH is used for the multicast. In this way, bit patterns of "1" for only one bit are used for the unicast, and bit patterns of "1" for multiple bits are used for the multicast. Therefore, by using the composition and operation for the multicast, the unicast can be also handled.

When the memory reading control circuit 12B receives a header field from the internal cell receiving section 10, it extracts the output index information from the header field and then conducts the read operation to the memory 13B using the extracted output index information as address. In reply to this, the memory 13B outputs, as output port number, data corresponding to the output index information (=memory address). The gate section 15B allows a buffer corresponding to a bit with "1" of the data output from the memory 13B to be enabled.

On the other hand, an internal cell sent to a delay circuit 14B is delayed in the delay circuit 14B during the processing time required to determine the route of the gate section 15B. After the internal route of the gate section 15B is determined, the internal cell is output from the delay circuit 14, passing through the enabled buffer of the gate section 15B, written into only a FIFO type buffer corresponding to the enabled buffer. In case of the multicast, they are written into multiple FIFO buffers of the FIFO buffers 17-1 to 17-n, and in case of the unicast, it is written into one FIFO buffer of the FIFO buffers 17-1 to 17-n.

Second Embodiment

In the second preferred embodiment of the invention, even in a case that a multicast cell is desired to be subject to the priority switching, it is nor necessary to provide separate circuits for the unicast and multicast in an existing circuit composition.

Figure 7:
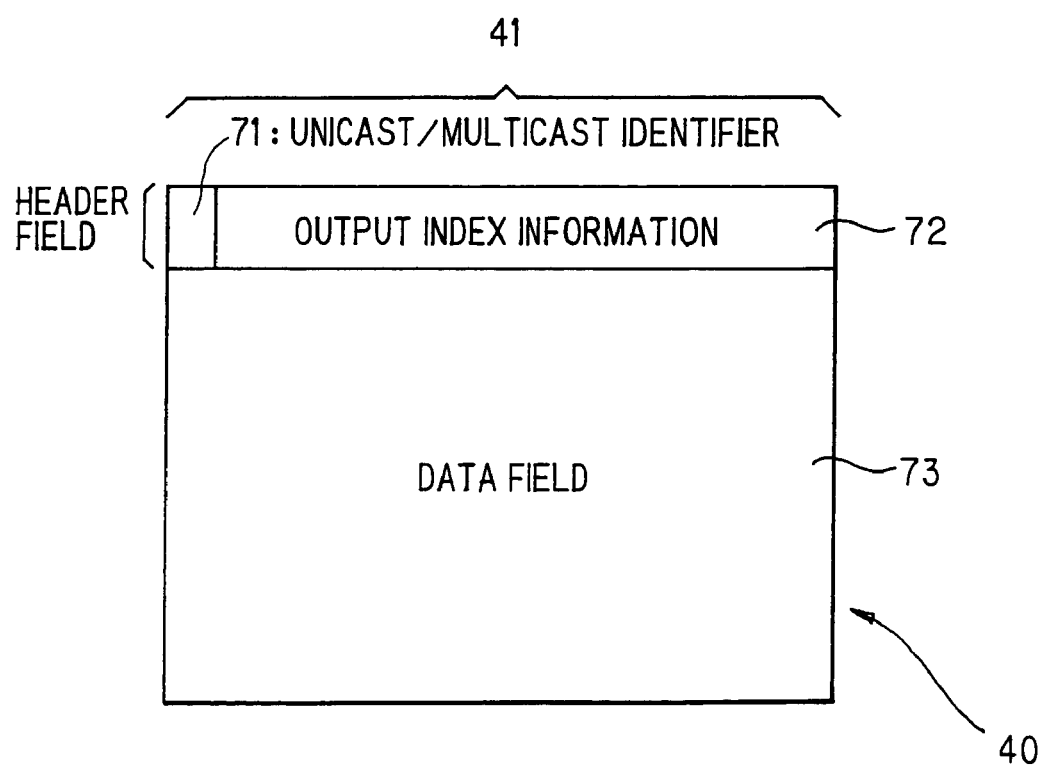
FIG. 7 is a format diagram showing an internal cell used in the unicast/multicast system in FIG. 6.

Referring to FIGS. 6 and 7, the second embodiment will be explained below.

FIFO buffers 17C-1 to 17C-n are provided for output ports, respectively, and FIFO buffers 17D-1 to 17D-n are provided for output ports, respectively. The FIFO buffers 17C-1 to 17C-n are provided for the unicast, and the FIFO buffers 17D-1 to 17D-n are provided for the multicast. Also, a FIFO buffer 17C-i and a FIFO buffer 17D-i are provided for an i-th output port. The gate section 15B is the same as that in the first embodiment. A gate section 15C in the second embodiment is an additional gate, and allows an internal cell passed through the gate section 15B to be alternatively supplied to either FIFO 17C-i for the unicast or FIFO 17D-i for the multicast. The internal cell receiving section 10, memory 13B and delay circuit 14 are the same as those in the first embodiment.

FIG. 7 shows the format of internal cell used in the second embodiment. In FIG. 7, an internal cell 40 used in the second embodiment is provided with a unicast/multicast identifier 71 and output index information 72 in header field 41. Similarly to the first embodiment, global user data such as IP packet and ATM cell are stored in data field 73.

When the internal cell receiving section 10 receives an internal cell, it extracts the header field of the internal cell and sends it to the memory reading control circuit 12C. Then, the memory reading control circuit 12C outputs the unicast/multicast identifier 71 of the header field to the gate section 15C, and outputs the output index information 72 thereof to the memory 13B. The memory 13B outputs, similarly to the first embodiment, a bit pattern corresponding to the output index information. The gate section 15B allows, similarly to the first embodiment, a buffer corresponding to a bit with "1" of the output bit pattern to be enabled. The gate section 15C allows a buffer corresponding to a FIFO buffer 17C-i for the unicast or a FIFO buffer 17D-i for the multicast to be enabled, according to the value of the unicast/multicast identifier 71. On the other hand, like the first embodiment, the internal cell sent from the internal cell receiving section 10 to the delay circuit 14B is delayed in the delay circuit 14B during a predetermined time, then passed through the enabled buffer of the gate section 15B. Then, if the unicast is designated by the unicast/multicast identifier 71, the internal cell passed through the enabled buffer of the gate section 15B is passed through a buffer of the gate section 15C corresponding to a FIFO buffer 17C-i for the unicast and written into the FIFO buffer 17C-i for the unicast. If the multicast is designated by the unicast/multicast identifier 71, the internal cell is passed through buffers of the gate section 15C corresponding to FIFO buffers 17D-i for the multicast and written into the FIFO buffers 17D-i for the multicast. Buffer management sections 17E-1 to 17E-n monitor the existence of internal cell stored in the FIFO buffers 17C-1 to 17C-n and 17D-1 to 17D-n. When it detects that the internal cell is stored in any of the FIFO buffers, it sends the switching request to the switching request adjusting section 19. When the transfer allowance to the crosspoint switch is issued from the switching request adjusting section 19, if there is stored a multicast cell, the buffer management sections 17E-1 to 17E-n transfers, by priority, the multicast cell to the crosspoint switch.

Advantages of the Invention:

First, since a unicast cell is similarly handled in the particular form of multicast cell, separate circuits for unicast cell and multicast cell is not necessary. Therefore, the processing circuit can be simplified.

Second, although the conventional system needs to be provided with separate buffers for the storing inside the system since the unicast cell and multicast cell are processed therein separately, in this invention the buffers for the multicast are not needed since the multicast cell is processed like the unicast cell.

Third, even when it is used with a crosspoint switch having no multicast function (=being not able to connect simultaneously to multiple routes), the multicast can be achieved.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed:

1. A unicast/multicast system, comprising:
   plural data output ports connected to an input of a crosspoint switch;
   an internal cell generating section that receives user data that includes destination information, and generates an internal cell comprising the received user data and output index information that maps the destination information to at least one of the plural data output ports; and
   an output port conversion memory storing a relationship between the output index information and the data output ports, the output port conversion memory storing a plurality of first bit patterns that each corresponds to one of the plural data output ports and storing a plurality of second bit patterns that each corresponds a plurality of the plural data output ports, the output index information identifying one of the first bit patterns when the user data is unicast data or one of the second bit patterns when the user data is multicast data.

2. The unicast/multicast system of claim 1, wherein:
   said output port conversion memory is addressed by a value of the output index information.

3. The unicast/multicast system of claim 1, wherein, the destination information comprises virtual path identifier and virtual channel identifier information.

4. A combined unicast and multicast system, comprising:
   plural data output ports connected to a crosspoint switch, each of the plural data output ports being designated by an output port number;
   an internal cell generating section to i) receive user data that includes destination information, and ii) generate, from the received user data, an internal cell comprising a header field added to the received user data,
   the header field comprising output port index information that maps the destination information to one of the data output ports when the received user data is unicast data and to plural ones of the data output ports when the received user data is multicast data,
   the internal cell generating section having a first output that outputs the internal cell toward the plural data output ports and a second output that outputs the header field; and
   an output port conversion section connected to i) receive the header field from the second output, ii) extract the output port index information from the header field, and iii) determine one or more output port numbers by using the extracted output port index information as an entry to a table providing a relationship between the output port index information and the one or more output port numbers,
   wherein, entries of the table map to only one of the data output ports when the user data is unicast data and to plural of the data output ports when the user data is multicast data.

5. The system of claim 4, wherein,
   the plural data output ports comprise a gate section of plural gates connected to a buffer section of plural buffers, each of the gates connected to one of the buffers, the buffers connecting to the crosspoint switch, and
   the one or more output port numbers from the table enabling a selected one or more of the gates to pass the user data to the crosspoint switch.

6. The system of claim 4, wherein,
   the header field further comprises an identifier indicating whether the user data is unicast data or multicast data,
   the output port conversion section extracts the identifier and, from the identifier, determines whether the user data is unicast data or multicast data.

7. A method within a system that comprises a plurality of data output ports connected to a crosspoint switch, the method comprising:
   receiving user data that includes destination information;

generating an internal cell comprising the received user data and output index information that maps the destination information to at least one of the data output ports;

storing a plurality of first bit patterns that each corresponds to one of the data output ports and storing a plurality of second bit patterns that each corresponds to plural ones of the data output ports;

identifying, based on the output index information, one of the first bit patterns when the user data is unicast data or one of the second bit patterns when the user data is multicast data; and providing the internal cell to the at least one of the data output ports based on the identified one of the first bit patterns or the identified one of the second bit patterns.

8. The method of claim 7, further comprising:

addressing the memory using a value of the output index information.

9. A method performed in a system that comprises a plurality of data output ports connected to a crosspoint switch, each of the data output ports being designated by an output port number, the method comprising:

receiving user data that includes destination information;

generating, from the received user data, an internal cell comprising a header field that includes output port index information corresponding to the destination information;

extracting the output port index information from the header field of the internal cell;

identifying one or more output port numbers in a memory at an address corresponding to a value of the extracted output port index information, the memory, at the address, storing information corresponding to a single one of the output port numbers when the received user data is unicast data or information corresponding to multiple ones of the output port numbers when the received user data is multicast data; and sending the internal cell to a single one of the output ports corresponding to the single one of the output port numbers, or to multiple ones of the output ports corresponding to the multiple ones of the output port numbers based on whether the user data is unicast data or multicast data.

10. The method of claim 9, where the header field further comprises an identifier indicating whether the user data is unicast data or multicast data, and where the method further comprises:

extracting the identifier; and determining, from the identifier, whether the user data is unicast data or multicast data.

11. The method of claim 9, further comprising:

storing in the memory, at the address, a single bit pattern that corresponds to one or more of the output port numbers.

12. A unicast/multicast system, comprising:

a plurality of data output ports connected to a crosspoint switch;

an internal cell generating section to:

receive user data that includes destination information, and generate an internal cell comprising the received user data and output index information; and an output port conversion memory that includes a plurality of entries, each of the entries storing a single bit pattern that corresponds to one or more of the data output ports, the output index information identifying one of the entries, if the user data corresponds to unicast data, the identified entry storing a single bit pattern that corresponds to a single one of the output ports, or if the user data corresponds to multicast data, the identified entry storing a single bit pattern that corresponds to multiple ones of the output ports.

* * * * *